(12) United States Patent
Parolini et al.

(10) Patent No.: US 8,974,180 B2
(45) Date of Patent: Mar. 10, 2015

(54) SYSTEM AND METHOD FOR ESTIMATING OPERATING TEMPERATURE OF TURBO MACHINERY

(75) Inventors: Jason Robert Parolini, Greenville, SC (US); Junyoung Park, Greenville, SC (US); Canan Uslu Hardwicke, Simpsonville, SC (US); Andrew Joseph Detor, Albany, NY (US)

(73) Assignee: General Electric Company, Schenectady, NY (US)

( * ) Notice: Subject to any disclaimer, the term of this patent is extended or adjusted under 35 U.S.C. 154(b) by 636 days.

(21) Appl. No.: 13/299,114

(22) Filed: Nov. 17, 2011

(65) Prior Publication Data
US 2013/0129510 A1    May 23, 2013

(51) Int. Cl.
| | | |
|---|---|---|
| *G01N 33/00* | (2006.01) | |
| *F01D 25/00* | (2006.01) | |
| *G01K 3/04* | (2006.01) | |
| *G01K 11/06* | (2006.01) | |
| *G01K 13/02* | (2006.01) | |

(52) U.S. Cl.
CPC *G01K 3/04* (2013.01); *G01K 11/06* (2013.01); *G01K 13/02* (2013.01); *G01K 2013/024* (2013.01)
USPC .......................... 416/1; 416/61; 416/241 R

(58) Field of Classification Search
USPC ........ 416/1, 61, 223 R, 241 R; 415/118, 200, 415/216.1; 436/2; 374/44, 45, 57, 141, 153
See application file for complete search history.

(56) References Cited

U.S. PATENT DOCUMENTS

| | | | |
|---|---|---|---|
| 3,839,898 A | | 10/1974 | Talboom, Jr. et al. |
| 4,923,308 A | * | 5/1990 | Watanabe et al. ............. 374/137 |
| 5,201,583 A | | 4/1993 | Lai et al. |
| 6,466,309 B1 | | 10/2002 | Kossakovski et al. |
| 8,252,601 B2 | * | 8/2012 | Bossmann et al. ............ 436/164 |
| 8,454,297 B2 | * | 6/2013 | Congiu et al. .................... 415/1 |
| 2004/0082069 A1 | | 4/2004 | Jiang et al. |

(Continued)

OTHER PUBLICATIONS

European Search Report and Written Opinion issued in connection with corresponding EP Application No. 12192421.1-1555 on Apr. 25, 2014.

(Continued)

*Primary Examiner* — Edward Look
*Assistant Examiner* — Jason Davis
(74) *Attorney, Agent, or Firm* — McNees Wallace & Nurick LLC

(57) ABSTRACT

A method for estimating an operating temperature of component in turbo machinery includes providing body detachably affixed to component, operating machinery, stopping operation of machinery, and removing body. The method includes obtaining concentration profile by determining final concentration of at least one species in first material and in second material, and determining a transient concentration of at least one species between first material and second material. The method includes determining an operating temperature by correlating concentration profile to corresponding operating temperature for system. A system including body is also provided. Body includes at least one species, a first material having a starting first concentration of the species, a second material arranged to permit migration of the species from first material to second material. Species migrates from first material to second material during operation of turbo machinery allowing body to estimate temperature during operation.

20 Claims, 5 Drawing Sheets

(56) References Cited

U.S. PATENT DOCUMENTS

| | | |
|---|---|---|
| 2004/0086024 A1* | 5/2004 | Choi .............................. 374/153 |
| 2006/0020415 A1 | 1/2006 | Hardwicke et al. |
| 2006/0256833 A1 | 11/2006 | Jiang et al. |
| 2009/0324389 A1 | 12/2009 | Fischetti et al. |
| 2010/0080689 A1 | 4/2010 | Lee et al. |
| 2010/0316496 A1* | 12/2010 | Williams et al. .............. 416/144 |

OTHER PUBLICATIONS

Testing Engineers Inc & Shell Research Ltd., "Templug (a temperature sensitive steel set-screw used for determining a maximum temperature)", pp. 1-2, Jul. 1, 2007.

* cited by examiner

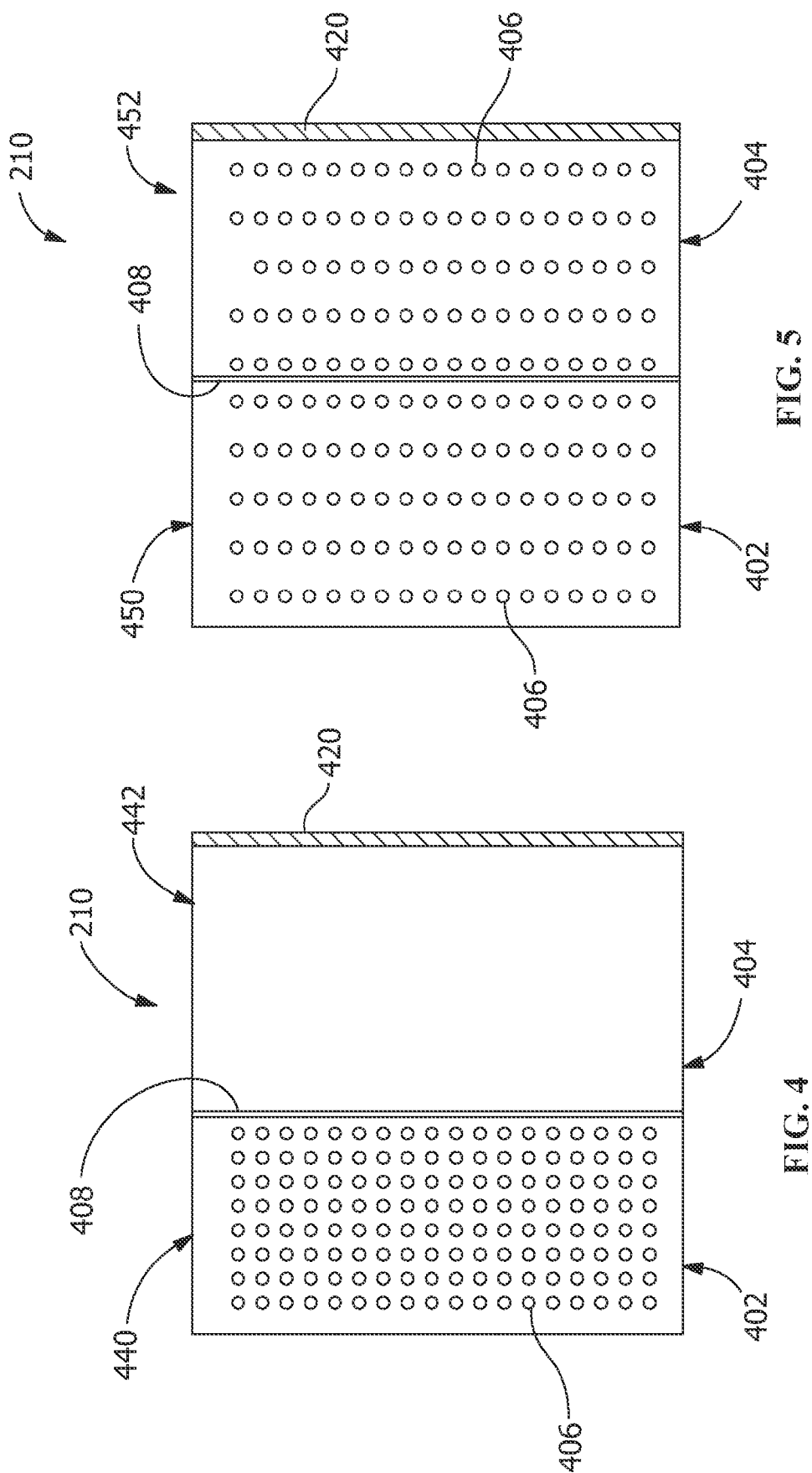

SYSTEM AND METHOD FOR ESTIMATING OPERATING TEMPERATURE OF TURBO MACHINERY

FIELD OF THE INVENTION

The present disclosure relates generally to a system and method for estimating operating temperature experienced by components in turbo machinery. More specifically the system and methods of the present disclosure utilize analysis of the metallurgical changes to a body to estimate the temperatures that a turbo machinery component of has been exposed to or has experienced, so that the remaining operational life and accumulated damage of the component may be assessed therefrom.

BACKGROUND OF THE INVENTION

Measuring the temperatures that a turbo machinery component (i.e., blades, vanes, rotors, wheels, casings, bolts, buckets, nozzles, combustion hardware and/or shrouds) has been exposed to or experienced is important to verify the design of the turbo machinery. Measuring the temperature is also useful to estimate metallurgical changes in the component, estimate the remaining operational life of the component, optimize inspection intervals, and regulate operational conditions. Turbo machinery includes but is not limited to, gas turbines, steam turbines, jet-engine turbines, and other turbine assemblies. Components subjected to extreme environments are particularly susceptible to degradation, the extent of which depends on a number of factors, such as the creep rate, rupture stress, stress/strain amplitude of cyclic loading, corrosion and/or erosion rate, and thermal mechanical fatigue, among other things. In some cases, such as when the component is exposed to high temperatures for prolonged periods of time, the component material undergoes metallurgical changes (e.g., chemistry, microstructure, etc.) that reduce the component's reliability and durability. The degree of effect that these factors may have depends on the operational working temperatures of the component. Therefore, the temperatures that are experienced by a component are an important parameter governing the life of such components, as is the time that is spent at these temperatures. Life assessment procedures have been developed to estimate the remaining operational life of such components based on the operating temperatures that these components have been exposed to or have experienced, and the time these components have spent in operation.

Currently, there are both destructive and non-destructive systems and methods for estimating the temperatures that a component has been exposed to or has experienced during operation of turbo machinery. Destructive systems and methods involve cutting up and destroying the component so that the characteristic metallurgical changes in the component can be investigated, and the time-temperature relationship can be estimated therefrom. Non-destructive systems and methods that have been used to estimate the temperatures that hot-gas-path components in gas turbines have been exposed to or have experienced include using thermocouples, pyrometers, eddy current sensors and/or temperature probes, among other things.

The current systems and methods for estimating temperatures have significant drawbacks: 1) many systems require a laborious procedure; 2) many systems use a complex arrangement of sensors; 3) many systems require components that are unable to sustain long hours at the high temperatures that turbo machinery components experience; 4) many systems include components that many are not resistant to the hostile environment (i.e., oxidation, corrosion) that components experience; 5) many systems are destructive to the components themselves, and/or 6) many systems are not suitable for moving parts.

Therefore, a simpler, more reliable, easier to use, non-destructive system and method that will allow the temperatures that components are exposed to be measured that does not suffer from the above drawbacks is desirable in the art.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure a system having a body detachably affixed to a component of turbo machinery is provided. The body includes at least one species, a first material having a starting first concentration of the at least one species, and a second material arranged to permit migration of the at least one species from the first material to the second material. The at least one species migrates from the first material to the second material during operation of the turbo machinery. The body is configured to estimate temperature in the turbo machinery during operation.

According to another exemplary embodiment of the present disclosure, a method for estimating an operating temperature of a component of turbo machinery is provided. The method includes providing a body detachably affixed to the component. The body includes at least one species, a first material having a starting first concentration of the at least one species, and a second material arranged to permit migration of the at least one species from the first material to the second material. The at least one species migrates from the first material to the second material during operation of the power generation system and wherein the body is configured to estimate temperature in the power generation system operation. The method includes operating the turbo machinery and then stopping the operation of the turbo machinery. The method includes removing the body from the component and obtaining a concentration profile by determining a final concentration of the at least one species in the first material and in the second material, and determining a transient concentration of the at least one species between the first material and the second material. The method includes determining an operating temperature by correlating the concentration profile to the corresponding operating temperature for the turbo machinery.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 is a schematic of first and second materials of a body prior to operation of turbo machinery of the present disclosure.

FIG. 5 is a schematic of first and second materials of a body after operation of the turbo machinery of the present disclosure.

Wherever possible, the same reference numbers will be used throughout the drawings to represent the same parts.

DETAILED DESCRIPTION OF THE INVENTION

Figure 1:
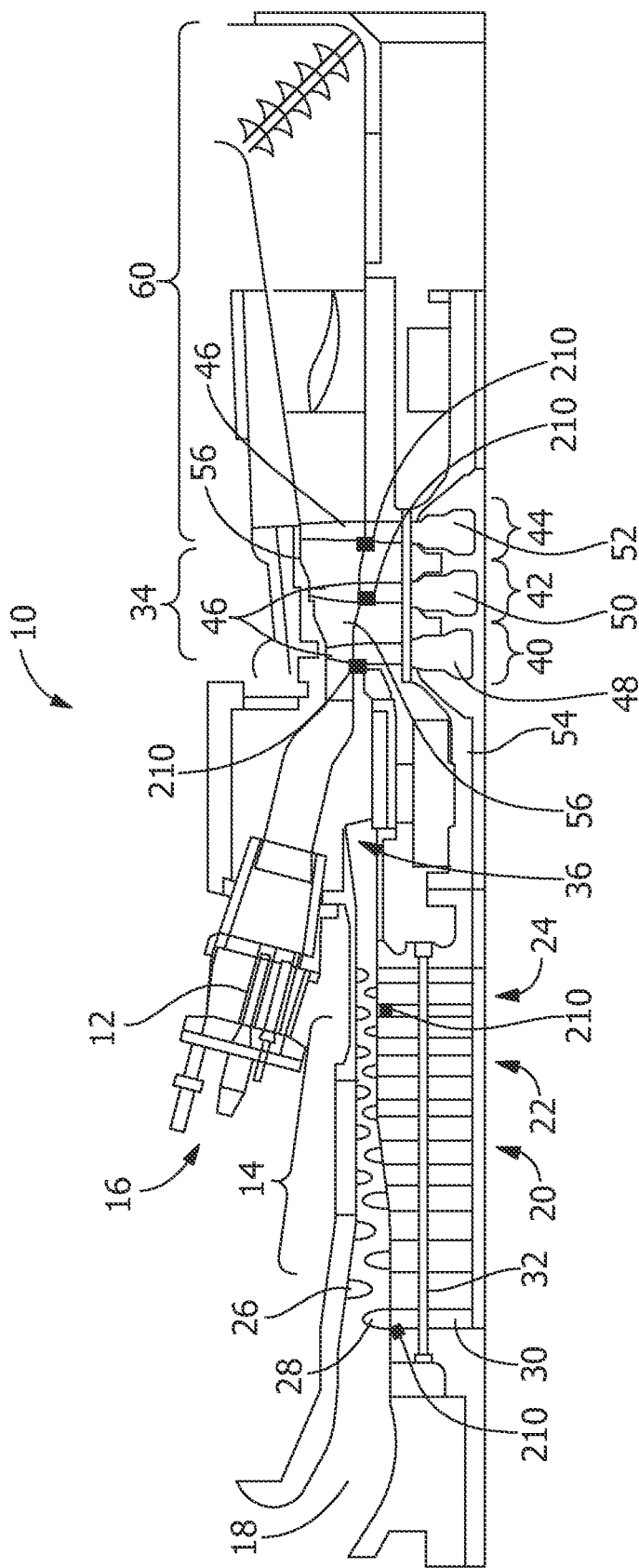
FIG. 1 is a cross-sectional view of turbo machinery of the present disclosure.

Provided is a simpler non-destructive system and method that allow the temperatures that components are exposed to in turbo machinery to be measured or estimated more accurately, reliably, conveniently and easily. One advantage of an embodiment of the present disclosure includes a system and method that allows the remaining operational life and/or accumulated damage of turbo machinery components to be assessed. Another advantage is that the system and method are non-destructive to the turbo machinery and turbo machinery components themselves. Yet another advantage is that the system and method uses bodies for estimating the temperatures that turbo machinery components have been exposed to or have experienced. Another advantage is that the system and method estimate the temperatures that turbo machinery components have been exposed to or have experienced based on the atomic diffusion characteristic changes of the bodies. Yet another advantage is that the system and method are configured such that they do not interfere with the aerodynamics and mechanical design of turbo machinery.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Specific structural and functional details disclosed herein are not to be interpreted as limiting, but merely as a basis for the claims as a representative basis for teaching one skilled in the art to variously employ the present invention. Any modifications or variations in the depicted systems and methods, and such further applications of the principles of the invention as illustrated herein, as would normally occur to one skilled in the art, are considered to be within the spirit of this invention.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Turbo machinery systems, may include but are not limited to, gas turbines, steam turbines, jet-engine turbines and other turbine assemblies. In certain applications, turbo machinery components (e.g., turbines, compressors, and pumps) are exposed to extreme environments and heavy wear conditions. For example, certain turbo machinery components such as blades, casings, rotor wheels, shafts, nozzles, and so forth, may operate in high heat and high revolution environments. As a result of the extreme environmental operating conditions, cracks, gouges, cavities, or gaps may develop on the surface of the components.

The present disclosure includes a body that operates as a sensor and is useful for estimating the temperatures that components of turbo machinery have been exposed to or have experienced during operation. Since the time components have spent in operation in turbo machinery is a known parameter, the temperatures the components have been exposed to or have experienced can be estimated, and may then be used to determine how much operational life remains for a given component. These estimated temperatures may also be used to determine how much damage has been accumulated by a given component.

Turning now to FIG. 1, components of turbo machinery 10, depicted in FIG. 1 as a gas turbine system, experience mechanical and thermal stresses during operating conditions, which may require periodic servicing of certain components. During operation of turbo machinery 10, a fuel such as natural gas or syngas, may be routed through one or more fuel nozzles 12 into a combustor 16. Air may enter turbo machinery 10 through an inlet 18 and may be compressed by a compressor 14. Compressor 14 may include a series of compressor wheels 20, 22, and 24 that compress the air. Each stage may include one or more sets of stationary vanes 26 and rotor blades 28. Rotor blades 28 rotate to progressively increase the pressure to provide compressed air and rotor blades 28 may be attached to compressor wheels 30 connected to compressor tie bolt 32. The compressed discharge air from compressor 14 may exit compressor 14 through a diffuser section 36 and may be directed into combustor 16 to mix with the fuel. In certain embodiments, turbo machinery 10 may include multiple combustors 16 disposed in an annular arrangement. Each combustor 16 may direct hot combustion gases into a turbine 34.

As depicted in FIG. 1, turbine 34 includes three separate series of turbine wheels 40, 42, and 44 surrounded by a turbine shell 56. Each series of turbine wheels 40, 42, and 44 includes a set of turbine blades or turbine buckets 46 coupled to a respective turbine wheel 48, 50, and 52, which are attached to a forward turbine shaft 54. As the hot combustion gases cause rotation of turbine blades 46, shaft 54 rotates to drive compressor 14 and any other suitable load, such as an electrical generator. Eventually, turbo machinery 10 diffuses and exhausts the combustion gases through an exhaust section 60. Turbo machinery components 200, such as, but not limited to, nozzles 12, inlet 18, compressor 14, vanes 26, blades 28, wheels 30, tie bolt 32, diffuser 36, stages 40, 42, and 44, blades 46, shaft 54, shell 56, and exhaust 60, include at least one body 210 (see FIGS. 2-3) that operates as a sensor useful for estimating the temperatures that components 200 of turbo machinery system 10 have been exposed to or have experienced during operation, as described in more detail below.

Figure 2:
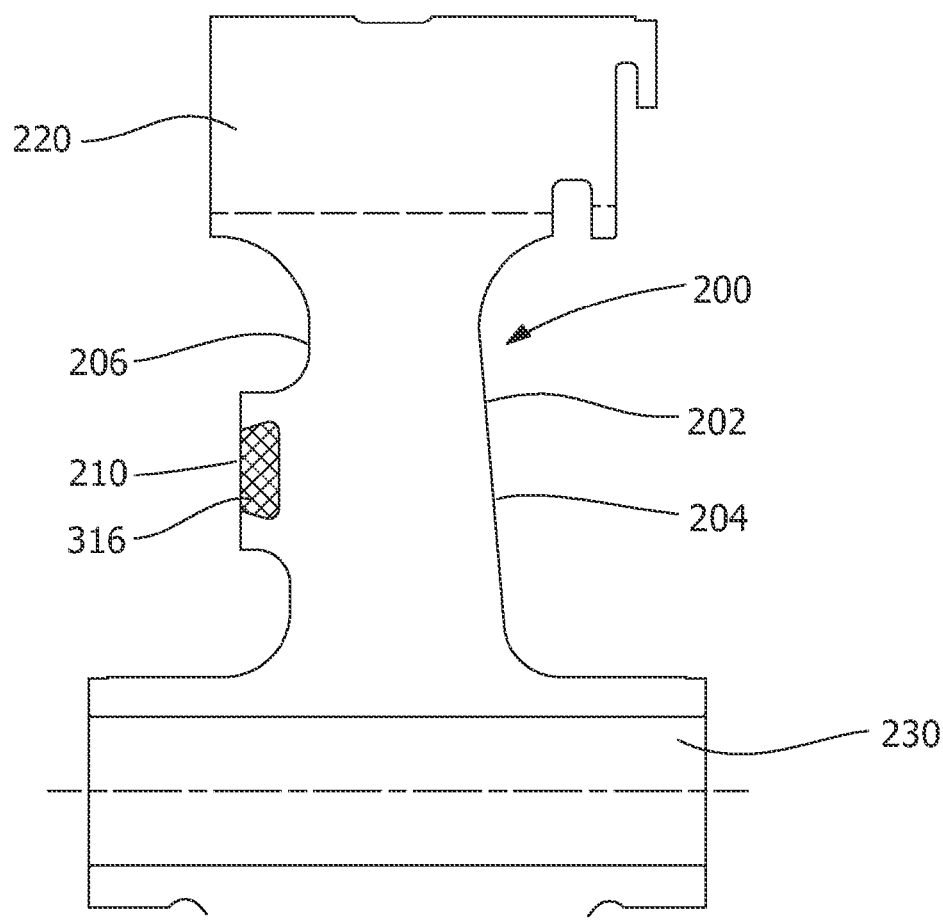
FIG. 2 is a cross-sectional view of a component of turbo machinery of the present disclosure.

FIG. 2 is a cross-section schematic of component 200 of turbo machinery 10. For illustrative purposes, in this embodiment, component 200 is a rotor wheel 202 of a gas turbine. The aft side 204 and forward side 206 of rotor wheel 202 are depicted. Rotor wheel 202 includes bolt circle 230 for receiving bolt or shaft (not shown). Dovetail 220 of blade is adjacent to rotor wheel 202. In an exemplary embodiment, body 210 is affixed to rotor wheel 202 on forward side 206. Body 210 is a balancing weight 316 for rotor wheel 202. In addition, body 210 operates to measure temperature of rotor wheel 202 during operation of turbo machinery 10, like a gas turbine or a steam turbine.

Figure 3:
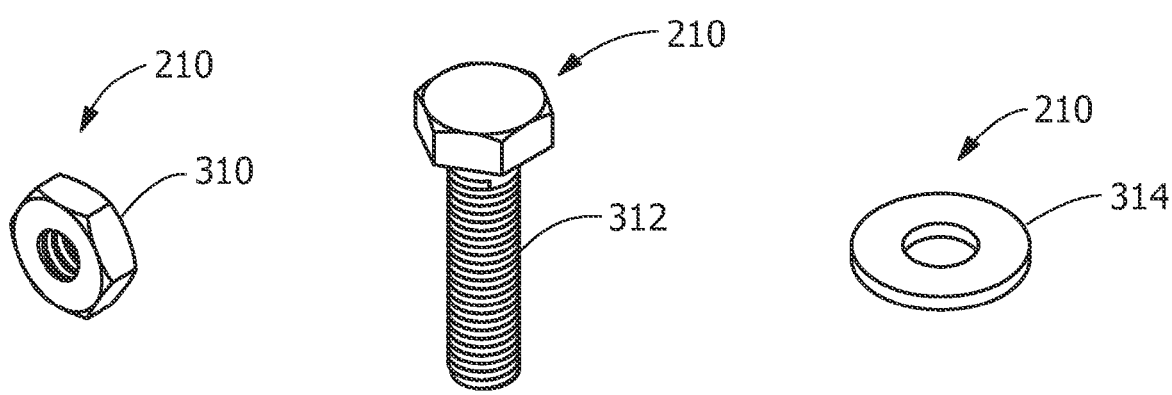
FIG. 3 is a schematic of exemplary bodies of the present disclosure.

As shown in FIG. 3, body 210 is any secondary component in turbo machinery 10, such as, but not limited to, rotor wheel balances 316 (see FIG. 2), bolts 312, nuts 310, lock wires, shims, seals 314, patch rings, and combinations thereof. Body 210, as a secondary component, operates to secure, balance, seal, or combinations thereof, of components 200 of turbo machinery 10, while also measuring temperature of component 200 during operation of turbo machinery 10.

As shown in FIGS. 4 and 5, the composition of body 210, allows for measurement of temperature for component 200 during operation of turbo machinery 10. As shown in FIG. 4, prior to operation of turbo machinery 10, body 210 includes at least one species 406, a first material 402 having a starting first concentration of at least one species 406, and a second material 404 arranged to permit migration of at least one species 406 from first material 402 to second material 404. Body 210, optionally contains boundary 408 between first material 402 and second material 404; however, boundary 408 is not necessary and is used to generally indicate the concentration difference of at least one species 406 between first material 402 and second material 404 prior to operation of turbo machinery 10.

As shown in FIG. 5, at least one species 406 migrates from first material 402 to second material 404 during operation of turbo machinery 10. Body 210 is configured to estimate temperature in turbo machinery 10 during operation. The migration of at least one species 406 from first material 402 to second material 404 and the resulting concentrations, allows the operating temperature during operation of turbo machinery 10 to be calculated.

First material 402 is selected from materials including, but not limited to, nickel, iron, cobalt, alloys thereof, and combinations thereof. Second material 404 is selected from nickel, iron, cobalt, alloys thereof, and combinations thereof. At least one species 406 is selected from stable atoms that act as diffusional players during operation of turbo machinery 10. Suitable examples of material for at least on species 406 include, but are not limited to atoms such as, carbon, nitrogen, oxygen, helium, hydrogen, phosphorus, sulfur, titanium, aluminum, boron, and combinations thereof. Without being bound by theory, it is believed that at least one species 406 will operate though interstitial diffusion through first material 402 base metal atoms.

As shown in FIG. 4, body 210 includes first material 402 having a first concentration 440 of at least one species 406 prior to operation of turbo machinery 10, such as a gas turbine or steam turbine for power generation. Generally, second material 404 does not contain at least one species 406 prior to operation of turbo machinery 10, and this is shown as second concentration 442. Prior to operation of turbo machinery 10, at time, t=0, first concentration 440 of at least one species 406 and second concentration 442, which is generally zero, are measured in body 210. The values for first concentration 440 and second concentration 442 are noted.

As shown in FIG. 5, after operation of turbo machinery 10, which has an operation time equal to t, body 210 includes a final atomic concentration 450 of at least one species 406 in first material 402 and a second atomic concentration 452 of at least one species 406 in second material 404. The operational time, t, is between approximately 10,000 hours to approximately 80,000 hours, or alternatively between approximately 10,000 hours to approximately 60,000 hours, or alternatively between approximately 15,000 hours to approximately 30,000 hours, depending on power generation system 10 and requirements. Operating temperature of turbo machinery 10 is between approximately 500° F. to approximately 2600° F., or alternatively between approximately 600° F. and approximately 1500° F., or alternatively between approximately 700° F. to approximately 1000° F.

Depending on body 210 construction and placement within turbo machinery 10, body 210 is configured to estimate an operating temperature of component 200 in a hot gas flow path or outside a hot gas flow path in turbo machinery 10.

In one embodiment, as shown in FIGS. 4 and 5, a portion of body 210 includes a protective coating 420. Protective coating 420 is optionally applied to body 210 to protect first material 402 and second material 404 from harsh operating conditions in turbo machinery 10. Protective coating 420 is selected from materials, such as, but not limited to, chromium, titanium, iron, aluminum, nickel, cobalt, platinum, tantalum, tungsten, hafnium, yttrium, alloys thereof and combinations thereof. Protective coating 402 is applied to body 210 using any suitable deposition technique, such as but not limited to, physical vapor deposition (PVD), sputtering, thermal spraying, slurry spraying, ion implantation and the like.

Figure 6:
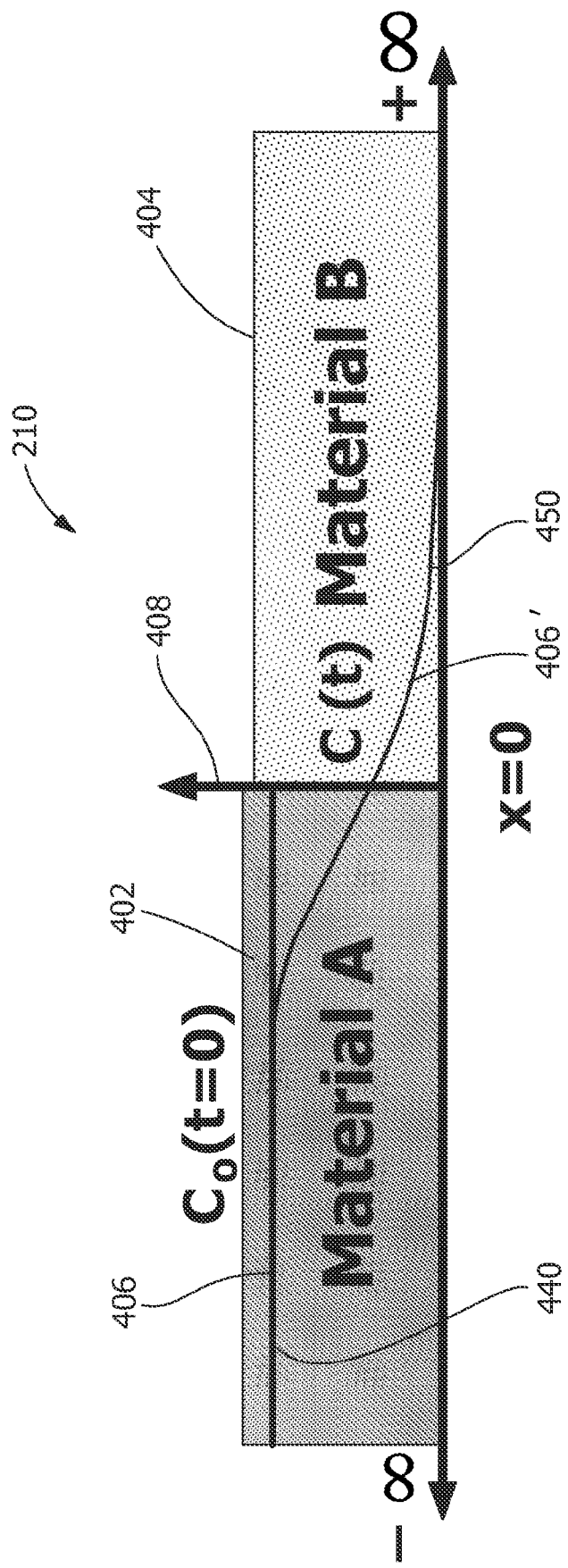
FIG. 6 is a concentration profile chart of at least one species of a body of the present disclosure.

As shown in FIG. 6, a concentration profile, $C(x,t)$, of body 210 including first material 402 and second material 404 is provided, where x is distance from interface 408 and t is operating time of power generation system 10. At t =0, prior to operation of turbo machinery 10, first material 402, has a first concentration 440 of at least one species 406 (see FIG. 4). The concentration profile of body 210 changes as at least one species 406 migrates or diffuses from first material 402 to second material 404 during operation of turbo machinery 10, and this indicated by the curved line labeled 406' (see FIG. 5). Final atomic concentration 450 of at least one species 406 in first material 402 and second material 404 is at time=t, where t is the operating time of turbo machinery 10. The transient concentration of at least one species 406 between first material 402 and second material 404 at time t is referred to as the concentration profile and is used to determine the operating temperature for turbo machinery 10.

Figure 7:
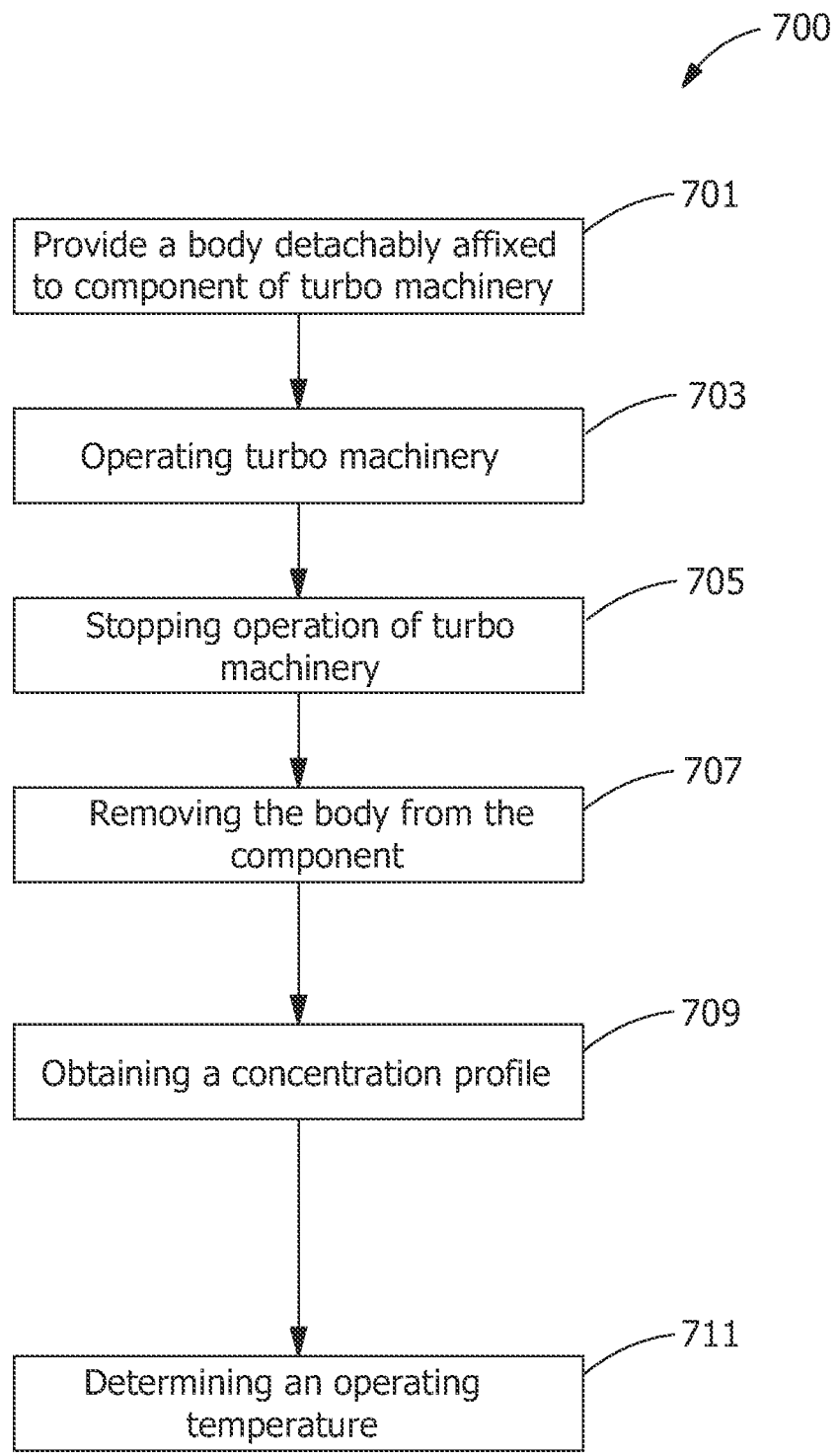
FIG. 7 is a flow chart of the method for estimating an operating temperature of a component of turbo machinery of the present disclosure.

As shown in FIG. 7, a method 700 for estimating an operating temperature of component 200 of turbo machinery 10 is provided. Example of turbo machinery, include but are not limited to gas turbines, steam turbine, jet-engine turbines, and other turbine assemblies. Method 700 includes providing body 210 detachably affixed to component 200 (see FIG. 2), step 701. Body 210 includes at least one species 406, first material 402 having a starting first concentration 440 of at least one species 406, and second material 404 arranged to permit migration of at least one species 406 from first material 402 to second material 404. At least one species 406 migrates from first material 402 to second material 404 during operation of turbo machinery 10. Body 210 is configured to estimate temperature in turbo machinery 10 during operation. Method 700 includes operating turbo machinery 10, step 703. Method 700 includes stopping the operation of turbo machinery 10, step 705. Method 700 includes removing body 210 from component 200, step 707. Step 707 of removing body 210 includes wholly or partially removing body 210 from component 200. Method 700 includes obtaining a concentration profile by determining final atomic concentration 450 of at least one species 406 in first material 402 and in second material 404, and determining a transient concentration of at least one species 406 between first material 402 and second material 404 (see FIG. 6), step 709. Method 700 includes determining an operating temperature by correlating the concentration profile of at least one species 406 from first material 402 to second material 404 to the corresponding operating temperature for turbo machinery 10, step 711.

Body 210 including at least one species 406, first material 402, second material 404, and optional interface 408 and may be constructed using several techniques. A melting-solidification process may be used to make body 210, where first material 402 is first melted and then solidified into desired form and second material 404 is first melted then solidified into desired form, and then first material 402 and second material 404 are joined using any suitable joining method, such as but not limited to welding, electron beam welding, laser welding, or diffusion coupling. Optional, interface 408, may be the joining material between first material 402 and second material 404. Body 210 may also be made by using a deposition process to apply second material 404 to first material 402. Deposition processes include processes, such as sputtering, thermal spraying, ion plasma deposition, electroless plating, electrodeposition, ion implantation, slurry coating, physical vapor deposition, or the like. Deposition process may also be used to apply at least one species 406 to first material 402. Any of these techniques can be used to form the desired body 210 shape, such as, but not limited to, rotor wheel balances 316 (see FIG. 2), bolts 312, nuts 310, lock wires, shims, seals 314, patch rings, and combinations thereof (see FIG. 3).

One exemplary method of making body 210 includes casting an alloy ingot of first material 402 using induction melting, arc melting, or the like; performing high temperature annealing to homogenize the alloy ingot of first material 402; and sectioning the alloy ingot into an appropriate sized alloy-based form that will form a portion of body 210. Second material 404 can be produced in the same manner and joined to first material to form body 210. Body 210, depending on shape and desired use can be attached to, secure, or balance component 200 (see FIG. 2).

Another exemplary method of making body 210 includes depositing a layer of second material 404 onto first material 402 using a direct-writing method, stamping, laser deposition, physical vapor deposition, chemical vapor deposition, or the like; and depositing additional layers of second material 404 onto first material 402 as desired to achieve the desired body 210 form. After applying second material 404 to first material 402, at least one species 406 is introduced in first material 402 using any suitable deposition method, such as but not limited to, physical vapor deposition, ion implantation, electrodeposition, sputtering, thermal spraying, or the like.

Body 210 can be made by electron beam welding the edges of first material 402 and second material 404, followed by hot isostatic pressing (HIP) at a predetermined temperature for a predetermined amount of time. After joining first material 402 and second material, a deposition process, such as by sputtering, thermal spraying, ion plasma deposition, or the like may be used to introduce at least one species 406 to first material 402 of body 210.

One exemplary method of making body 210 includes pressing thin foils of first material 402 and second material 404 together using cold pressing, cold isostatic pressing, hot isostatic pressing, or the like to make diffusion coupled bodies 210; then introducing at least one species to first material 402. Bodies 210 then can be shaped into desired secondary component, such as a seal 314 (see FIG. 3).

The above described manners of making body 210 are meant to be exemplary, not limiting, examples of how body 210 can be made. Many other methods of making body 210 are also possible, as will be recognized by those skilled in the art.

Before use, relationships of temperature-specific characteristics of body 210 may first need to be established and catalogued. For example, the chemistry, lattice parameter/phase fraction, hardness/modulus, electrical properties and/or magnetic properties, and/or the diffusion distances at various temperatures, for at least first material 402 and second material 404 could be established and calibrated corresponding to the applicable operational temperature range of power generation system 10. Any suitable methods may be utilized to measure or determine the temperature-specific characteristics of body 210.

For example, the chemistry of body 210 including first material 402 including at least one species 406 and second material 404 may be measured or determined by electron microprobe analysis using either wavelength dispersive spectroscopy (WDS) or energy dispersive spectroscopy (EDS), x-ray fluorescence, laser plasma spectroscopy, or the like. The lattice parameter/phase fraction of first material 402 and second material 404 may be measured or determined by x-ray diffraction, high energy x-ray diffraction, neutron diffraction, image analysis integrating optical and/or electron microscopy, or the like. The hardness/modulus of first material 402 and second material 404 may be measured or determined by nanoindentation, microhardness testing, ultrasonic modulus measurement techniques, or the like. The electrical properties (in terms of resistivity and/or conductivity) of either first material 402 or second material 404 of body 210 may be measured or determined by eddy current probe. The magnetic properties (in terms of magnetic field) of either first material or second material of body 210 can be measured or determined by eddy current probe. The diffusion characteristics (i.e., diffusion distances at various temperatures) of at least one species 406 of body 210 can be measured or determined by electron microprobe analysis using either wavelength dispersive spectroscopy (WDS) or energy dispersive spectroscopy (EDS), or nanoindentation. Finally, the surface microvoltage of first material 402 or second material 404 of body 210 may be measured by thermoelectric unit measurements.

Once the operational conditions are identified, and the relationships of the temperature-specific characteristics of body 210 are established, body 210 which operates as a secondary component, may then be attached to, or applied directly onto, secured to, balance, or seal component 200 of turbo machinery 10. Body 210 does not interfere with the aerodynamics or mechanical design of component 200 (see FIG. 2). While body 210 has been described here as nut 310, bolts 312, metallic seals 314, balancing weight 316, lock wire, shim, patch ring, and combinations thereof, body 210 can be any secondary component of turbo machinery 10. Body 210 is exposed to or experiences the same operating temperatures and shut down cycles as component 200 itself.

During operation of turbo machinery 10, components 200 and body 210 typically are exposed to or experience operating temperatures for a given period of time, and are then shut down. The shutdown process is similar to a quenching process, where component 200 is quickly cooled down from the operating temperature. Body 210 is designed so that the time spent at operating temperature changes causes a migration of at least one species 406 from first material 402 to second material 404, and the fast cooling of component 200 and body 210 during the shut down process preserves the temperature microstructure in body 210. The metallurgical characteristic change body and diffusion/migration of at least one species 406 from first material 402 to second material 404 allows the last temperature and/or the average temperature of component of power generation system 10 to be accurately estimated therefrom.

Temperature estimation depends on the diffusion process of at least one species 406 in first 402 material to second material 404, and the time body 210 spends in operation. The exposure or operating temperatures of body 210 can be estimated by analyzing the diffusion kinetics of at least one species 406 from first material 402 to second material 404. During operation of power generation system 10, the at least one species 406 in first material 402 is designed to interact and diffuse into second material 404 to form intermetallic compounds or interdiffusion zones according to various temperatures. The formation of these intermetallic compounds or interdiffusion zones, as well as the thickness of the zones, allows the exposure or operating temperatures of body 210 to be evaluated. A Scanning Electron Microscope (SEM) couple with an energy dispersive x-ray spectroscopy (EDS) detector or wavelength dispersive x-ray spectroscopy (WDS) detector can be used to determine the interdiffusion of the at least one species 406 between first material 404 to second material 406 of body 210 (see FIG. 5). Since the time that body 210 and component 200 are in operation is known, the operating temperatures can be back-calculated from the diffusion characteristic changes of at least one species 406 that are observed body 210, namely in first material 402 and second material 404.

During a shutdown of turbo machinery 10, or at any other suitable time, body 210 may be separated from component 200, and diffusion kinetics body 210 can be analyzed. Alternatively, body 210 may be analyzed while still on, or attached to, secured to, or balancing component 200. The analysis may be done either destructively (i.e., via microprobe analysis or nanoindentation, etc.) or non-destructively (i.e., via x-ray diffraction or neutron diffraction analysis, etc.). Because body 210 can be easily separated from component 200, the analysis can be performed in any manner using non-destructive or destructive analysis.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A system having a body detachably affixed to a component of turbo machinery, the body comprising:
   at least one species;
   a first material having a starting first concentration of the at least one species; and
   a second material arranged to permit migration of the at least one species from the first material to the second material,
   wherein the at least one species migrates from the first material to the second material during operation of the turbo machinery;
   wherein the body is configured to estimate temperature in the turbo machinery during operation; and
   wherein the body is a secondary component of the turbo machinery.

2. The system of claim 1, wherein the component is a rotor wheel.

3. The system of claim 2, wherein the body is configured to balance the rotor wheel of a gas turbine.

4. The system of claim 1, wherein the body comprises at least one of a bolt, nut, lock wire, shim, seal, patch ring, and combinations thereof.

5. The system of claim 1, wherein the body includes a protective coating.

6. The system of claim 5, wherein the protective coating is selected from chromium, titanium, iron, aluminum, nickel, cobalt, platinum, tantalum, tungsten, hafnium, yttrium, alloys thereof and combinations thereof.

7. The system of claim 1, wherein the first material is selected from nickel, iron, cobalt, alloys thereof, and combinations thereof.

8. The system of claim 1, wherein the second material is selected from nickel, iron, cobalt, alloys thereof, and combinations thereof.

9. The system of claim 1, wherein at least one species is selected from carbon, nitrogen, oxygen, helium, hydrogen, phosphorus, sulfur, titanium, aluminum, boron, and combinations thereof.

10. The system of claim 1, wherein the body includes a final first atomic concentration of the at least one species in the first material and a final second atomic concentration of the at least one species in the second material at an operational time equal to t, where t is between approximately 10,000 hours and approximately 80,000 hours, and the turbo machinery operates at temperatures of between about 700° F. and about 1000° F.

11. The system of claim 1, wherein the body is configured to estimate an operating temperature of the component in a hot gas flow path in the turbo machinery.

12. The system of claim 1, wherein the body is configured to estimate an operating temperature of the component outside a hot gas flow path in the turbo machinery.

13. A method for estimating an operating temperature of a component in turbo machinery comprising:
   providing a body detachably affixed to the component, the body comprising:
      at least one species;
      a first material having a starting first concentration of the at least one species; and
      a second material arranged to permit migration of the at least one species from the first material to the second material;
      wherein the at least one species migrates from the first material to the second material during operation of the turbo machinery and wherein the body is configured to estimate temperature in the turbo machinery during operation; and
      wherein the body is a secondary component of the turbo machinery;
   operating the turbo machinery;
   stopping the operation of the turbo machinery;
   removing the body from the component;
   obtaining a concentration profile by determining a final concentration of the at least one species in the first material and in the second material, and determining a transient concentration of the at least one species between the first material and the second material; and
   determining an operating temperature by correlating the concentration profile to the corresponding operating temperature for the turbo machinery.

14. The method of claim 13, wherein the body includes a protective coating.

15. The method of claim 14, wherein the protective coating is selected from chromium, aluminum, nickel, iron, titanium, cobalt, platinum, tantalum, tungsten, hafnium, yttrium, alloys thereof, and combinations thereof.

16. The method of claim 13, further comprising a step of, after the step of correlating, estimating a remaining operational life of the component.

17. The method of claim 13, wherein the step of determining comprises at least one of Auger electron spectroscopy, electron microprobe analysis, wavelength dispersive spectroscopy, energy dispersive spectroscopy, Rutherford backscattering spectroscopy (RBS), x-ray fluorescence, x-ray photoelectron spectroscopy, secondary ion mass spectrometry, laser plasma spectroscopy, high energy x-ray, neutron diffraction analysis, image analysis integrating optical microscopy, image analysis integrating electron microscopy, nanoindentation, microhardness testing, ultrasonic modulus measurement techniques, eddy current probing, and thermoelectric unit measurements.

18. The method of claim 13, wherein the body is configured to balance a rotor wheel of in a power generation system.

19. The method of claim 13, wherein the first material of the body is selected from nickel, iron, cobalt alloys thereof, and combinations thereof, and includes the at least one species selected from carbon, nitrogen, oxygen, helium, hydrogen, phosphorus, sulfur, aluminum, titanium, boron, and combinations thereof.

20. The method of claim 13, wherein the body includes a final first atomic concentration of the at least one species in the first material and a final second atomic concentration of the at least one species in the second material at time equal to t, where t is between approximately 10,000 hours and approximately 80,000 hours.

* * * * *